(12) United States Patent
van Schoor et al.

(10) Patent No.: US 8,608,172 B2
(45) Date of Patent: Dec. 17, 2013

(54) BULKHEAD SEAL

(75) Inventors: Marthinus van Schoor, Medford, MA (US); Steven Klepper, Stoneham, MA (US); Andrew Cutler, Boston, MA (US)

(73) Assignee: Mide Technology Corporation, Medford, MA (US)

( * ) Notice: Subject to any disclaimer, the term of this patent is extended or adjusted under 35 U.S.C. 154(b) by 845 days.

(21) Appl. No.: 12/798,941

(22) Filed: Apr. 13, 2010

(65) Prior Publication Data

US 2011/0248450 A1   Oct. 13, 2011

(51) Int. Cl.
*F01D 11/04* (2006.01)
*F16J 15/32* (2006.01)
*F16J 15/00* (2006.01)

(52) U.S. Cl.
USPC ............................ 277/304; 277/549; 277/500

(58) Field of Classification Search
USPC .................. 277/549, 551, 553, 556
See application file for complete search history.

(56) References Cited

U.S. PATENT DOCUMENTS

| | | | |
|---|---|---|---|
| 2,185,790 A * | 1/1940 | Kosatka et al. | 277/562 |
| 2,565,923 A * | 8/1951 | Hrdlicka, Jr. | 277/346 |
| 2,849,070 A * | 8/1958 | Maly | 277/336 |
| 2,866,670 A * | 12/1958 | Harris et al. | 384/484 |
| 2,937,039 A * | 5/1960 | Santapa | 277/422 |
| 3,413,008 A * | 11/1968 | Greiner | 277/505 |
| 3,726,531 A * | 4/1973 | Pagan et al. | 277/563 |
| 3,934,952 A | 1/1976 | Gardner | |
| 3,945,650 A * | 3/1976 | Voitik | 277/556 |
| 3,948,531 A | 4/1976 | Mitrani | |
| 4,155,957 A * | 5/1979 | Sasayama | 525/108 |
| 4,182,518 A * | 1/1980 | Bunyan | 277/320 |
| 4,188,031 A * | 2/1980 | Fox | 473/454 |
| 4,188,039 A | 2/1980 | Krisak et al. | |
| 4,189,157 A * | 2/1980 | Mahan et al. | 277/301 |
| 4,348,031 A | 9/1982 | Johnston | |
| 4,403,779 A * | 9/1983 | Wilkinson | 277/581 |
| 4,413,829 A * | 11/1983 | Pietsch | 277/504 |
| 4,449,713 A * | 5/1984 | Ishido et al. | 277/312 |

(Continued)

FOREIGN PATENT DOCUMENTS

DE   4121193 A1   1/1993
GB   2061415 A   5/1981

(Continued)

OTHER PUBLICATIONS

Written Opinion of the International Searching Authority, International Application No. PCT/US2011/001301, Jan. 6, 2012, three (3) pages.

(Continued)

*Primary Examiner* — Vishal Patel
*Assistant Examiner* — L. Susmitha Koneru
(74) *Attorney, Agent, or Firm* — Iandiorio Teska & Coleman LLP

(57) ABSTRACT

A bulkhead seal includes a housing configured to be attached to a bulkhead about a shaft and defining an annular recess. An annular diaphragm seal is rotatably disposed in the annular recess of the housing and about the shaft. A plurality of orifices extend through the annular diaphragm seal to prevent air pressure differentials from locking the annular diaphragm seal with respect to the housing. A lip seal is provided on each side of the annular diaphragm seal. Each lip seal includes a seal portion disposed to seal the orifices in the presences of liquid.

7 Claims, 4 Drawing Sheets

(56) References Cited

U.S. PATENT DOCUMENTS

| | | | | |
|---|---|---|---|---|
| 4,449,719 | A * | 5/1984 | Radosay et al. | 277/543 |
| 4,471,964 | A * | 9/1984 | Kotzur | 277/347 |
| 4,595,206 | A * | 6/1986 | Holzer | 277/366 |
| 4,643,439 | A * | 2/1987 | Lewis et al. | 277/402 |
| 4,740,404 | A * | 4/1988 | Otsugu et al. | 428/44 |
| 4,954,084 | A * | 9/1990 | Pugh et al. | 439/29 |
| 5,024,450 | A * | 6/1991 | Hawley et al. | 277/366 |
| 5,096,356 | A * | 3/1992 | Foster | 414/325 |
| 5,125,502 | A * | 6/1992 | Foster | 198/750.3 |
| 5,176,677 | A * | 1/1993 | Wuchinich | 606/46 |
| 5,216,840 | A * | 6/1993 | Andrews | 49/483.1 |
| 5,277,915 | A * | 1/1994 | Provonchee et al. | 424/485 |
| 5,624,290 | A * | 4/1997 | Von Bergen et al. | 440/80 |
| 5,639,098 | A * | 6/1997 | MacDonald | 277/391 |
| 5,643,026 | A * | 7/1997 | Pietsch et al. | 440/112 |
| 6,039,320 | A * | 3/2000 | MacDonald | 277/370 |
| 6,173,964 | B1 * | 1/2001 | Bell et al. | 277/584 |
| 6,224,058 | B1 * | 5/2001 | Drebing et al. | 277/313 |
| 6,234,910 | B1 * | 5/2001 | Norberg | 464/182 |
| 6,240,321 | B1 * | 5/2001 | Janke et al. | 607/122 |
| 6,254,102 | B1 * | 7/2001 | Vicory, Sr. | 277/390 |
| 6,303,711 | B1 * | 10/2001 | Sumiya et al. | 526/73 |
| 6,375,901 | B1 * | 4/2002 | Robotti et al. | 422/502 |
| 6,524,151 | B1 * | 2/2003 | Clemente et al. | 440/112 |
| 6,698,669 | B2 * | 3/2004 | Rieben | 239/225.1 |
| 6,702,300 | B1 * | 3/2004 | Steinetz et al. | 277/642 |
| 7,313,829 | B1 * | 1/2008 | Serra et al. | 2/2.15 |
| 7,828,299 | B2 * | 11/2010 | van Schoor et al. | 277/551 |
| 2002/0016622 | A1 * | 2/2002 | Janke et al. | 607/116 |
| 2003/0010486 | A1 * | 1/2003 | Serra et al. | 165/185 |
| 2004/0009205 | A1 * | 1/2004 | Sawhney | 424/423 |
| 2005/0038368 | A1 * | 2/2005 | Richter et al. | 602/41 |
| 2006/0108745 | A1 * | 5/2006 | Van Schoor | 277/500 |
| 2008/0258406 | A1 * | 10/2008 | Dahlheimer | 277/569 |
| 2008/0303218 | A1 * | 12/2008 | van Schoor et al. | 277/304 |
| 2010/0301566 | A1 * | 12/2010 | Van Schoor et al. | 277/549 |

FOREIGN PATENT DOCUMENTS

| | | |
|---|---|---|
| GB | 2417993 A | 3/2006 |
| JP | 60192167 | 9/1985 |
| JP | 63087309 | 4/1988 |
| JP | 6-35661 | 5/1994 |
| JP | 10073188 | 3/1998 |
| JP | 11324506 | 11/1999 |
| JP | 2002-295690 | 10/2002 |
| JP | 2003-83456 | 3/2003 |
| NL | 6610389 | 1/1967 |
| WO | WO 2006/086039 | 8/2006 |

OTHER PUBLICATIONS

First Amended Verified Complaint and Jury Demand, Civil Action No. 1:08-cv-11133-RGS—filed Dec. 18, 2008 in the United States District Court of Massachusetts.

Written Opinion of the International Searching Authority; PCT Application No. PCT/US2009/0465599, mailed Sep. 24, 2009, (10 pgs. (unnumbered)).

Written Opinion of the International Searching Authority; PCT Application No. PCT/US2005/042683, mailed Jun. 30, 2006, (5 pgs. (unnumbered)).

Wartsila Deep Sea Seals, Wartsila Propulsion U.K., http://www.wartsila.com/Wartsila/global/docs/en/ship_power/media_publications/brochures/product/manesafe.pdf, (2 pgs. (unnumbered)).

Written Opinion of the International Searching Authority, International Application No. PCT/US2011/000635, Jun. 21, 2011, 7 pgs. (unnumbered).

* cited by examiner

BULKHEAD SEAL

FIELD OF THE INVENTION

The subject invention relates to seals and, in one particular embodiment, a bulkhead seal which seals a bulkhead in a vessel with respect to a rotating shaft.

BACKGROUND OF THE INVENTION

In watercraft, a shaft for the propeller typically extends through one or more bulkheads separating ship compartments. If a compartment is breached, water can flow into an adjacent compartment via the gap between the bulkhead and the shaft.

Accordingly, bulkhead seals have been developed. See, for example, U.S. Pat. No. 4,403,779. In another example, Wärtsilä Propulsion UK (4 Marples Way, Havant, Hants PO9 1NX, UK) developed a "ND" and "NS" type seal including a diaphragm seal which rotates with the shaft within a housing fixed to the bulkhead. A watertight seal is supposed to be created between the diaphragm and the housing only in the presence of water when the water pressure urges the diaphragm seal into engagement with the housing.

BRIEF SUMMARY OF THE INVENTION

But, air pressure differentials can cause the diaphragm seal to lock up with respect to the housing whereupon the diaphragm seal stops rotating with respect to the shaft and an O-ring between the shaft and the diaphragm seal is quickly destroyed. Then, later, if there is a breach in a compartment, water will flow past the seal through the bulkhead and into an adjacent compartment.

In one aspect, the invention provides a new seal which, in one preferred embodiment, is a bulkhead seal. The new seal addresses the problem of the prior seal failing in the presence of air pressure differentials. Moreover, the new seal can be used in existing seal housings reducing the time and expense associated with installing new seals in watercraft.

The subject invention results at least from the partial realization that, in one preferred embodiment, the air pressure differential problem is addressed by forming orifices through the thickness of the diaphragm seal and that these orifices can be sealed with respect to liquid by a unique sealing structure employing a composition which expands in the presence of water.

The subject invention, however, in other embodiments, need not achieve all these objectives and the claims hereof should not be limited to structures or methods capable of achieving these objectives.

A new bulkhead seal in accordance with the invention features, in one design, a housing configured to be attached to a bulkhead about a shaft and defining an annular recess. The housing can be the same housing already employed in the vessel. An annular diaphragm seal is rotatably disposed in the annular recess of the housing and about the shaft. A plurality of orifices extend through the annular diaphragm seal to prevent air pressure differentials from locking the annular diaphragm seal with respect to the housing. A lip seal on each side of the annular diaphragm seal includes a seal portion disposed to seal and unseal the orifices. A retaining ring for each lip seal is provided defining a pocket between each lip seal and its retaining ring. A foam body resides in each pocket and includes a gel material configure to expand the foam body in the presence of liquid urging the seal portions of the lip seal to seal the orifices. The gel material preferably contracts the foam body when no liquid is present to unseal the orifices.

Typically, there is an O-ring seal between the annular diaphragm seal and the shaft. The annular diaphragm seal may include an inner surface with a groove for receiving the O-ring. In one example, the annular diaphragm seal also includes an inwardly tapered portion terminating at the inner surface. Typically, the annular diaphragm seal includes opposing side walls each with a first channel receiving the lip seal therein and a second channel receiving the retainer therein.

The subject invention also features a seal comprising a housing including an annular recess, an annular diaphragm seal disposed in the annular recess of the housing, a plurality of orifices through the annular diaphragm seal to reduce air pressure differentials across the annular diaphragm seal, and a sealing structure for the orifices configured to seal them in the presence of a liquid.

One preferred sealing structure includes a lip seal on each side of the annular diaphragm seal. Each lip seal includes a seal portion disposed to seal and unseal the orifices. The preferred sealing structure further includes a material configured to expand in the presence of liquid to urge each lip seal to seal the orifices in the presence of liquid. In one design, the material includes a gel material disposed in a foam body and a retaining ring for each lip seal defines a pocket for the foam body.

The invention also features a seal comprising an annular diaphragm seal to be disposed about a rotating body, a plurality of orifices through the annular diaphragm seal to reduce air pressure differentials across the annular diaphragm seal, and a sealing structure for the orifices configured to seal them in the presence of liquid. The annular diaphragm seal typically resides in a housing.

The invention also features a method of sealing a shaft with respect to a bulkhead. The preferred method includes installing a housing with respect to the bulkhead about the shaft and inserting an annular diaphragm seal into the housing and about the shaft. Air is allowed to pass through the annular diaphragm seal when no liquid is present. The annular diaphragm seal is sealed with respect to liquid when liquid is present. The shaft is sealed to the annular diaphragm seal and the annular diaphragm seal is sealed with respect to the housing in the presence of liquid. Typically, the annular diaphragm seal is not sealed with respect to the housing in the absence of liquid.

Allowing the air to pass through the annular diaphragm seal may include forming orifices through the thickness of the annular diaphragm sealed with respect to liquid when liquid is present. A sealing structure may be employed which expands in the presence of liquid to seal the orifices.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
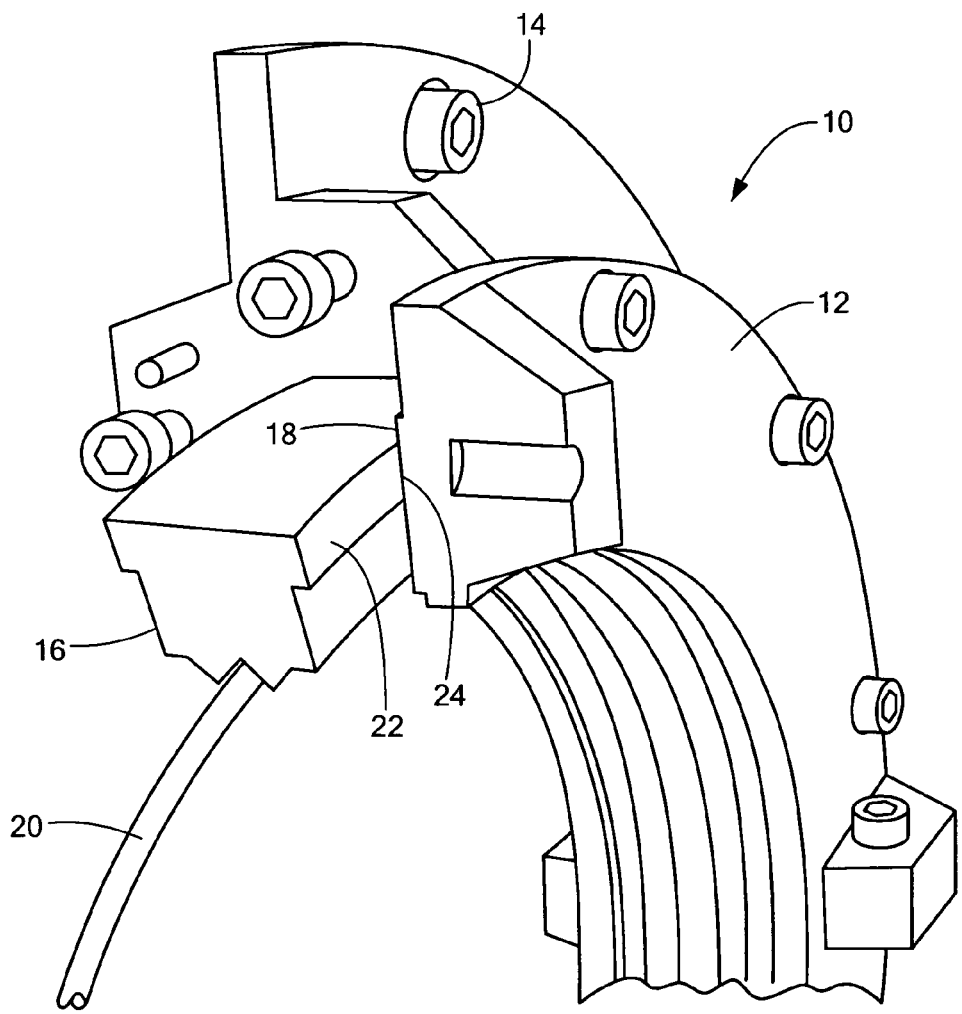
FIG. 1 is a schematic partial view of an example of one prior art bulkhead seal.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows one aspect of a prior art "NS type" bulkhead seal 10. Housing 12 is secured to one side of a bulkhead via fasteners 14. Angular diaphragm seal 16 is disposed in annular recess 18 in housing 12 and supports O-ring 20. Annular diaphragm seal 16 rotates with the shaft which extends through the bulkhead, O-ring 20, diaphragm seal 16, and housing 12.

When water fills a compartment, water pressure drives side wall 22 of diaphragm seal 16 to mate with wall 24 of housing 12 and the diaphragm seal 16 stops rotating. But, since water is present about O-ring 20, the integrity of the O-ring is not usually adversely affected.

One problem with such a design, as noted in the background section above, is that air pressure differentials can also cause side wall 22 of diaphragm seal 16 to mate with wall 24 of housing 12. Diaphragm seal 16 stops rotating. Since there is no lubrication for O-ring 20, its integrity is quickly compromised and it is often destroyed. Then, later, when water breaches a compartment, it can bypass seal 10 between diaphragm seal 16 and the shaft since O-ring 20 is not present or is ineffective.

Figure 2:
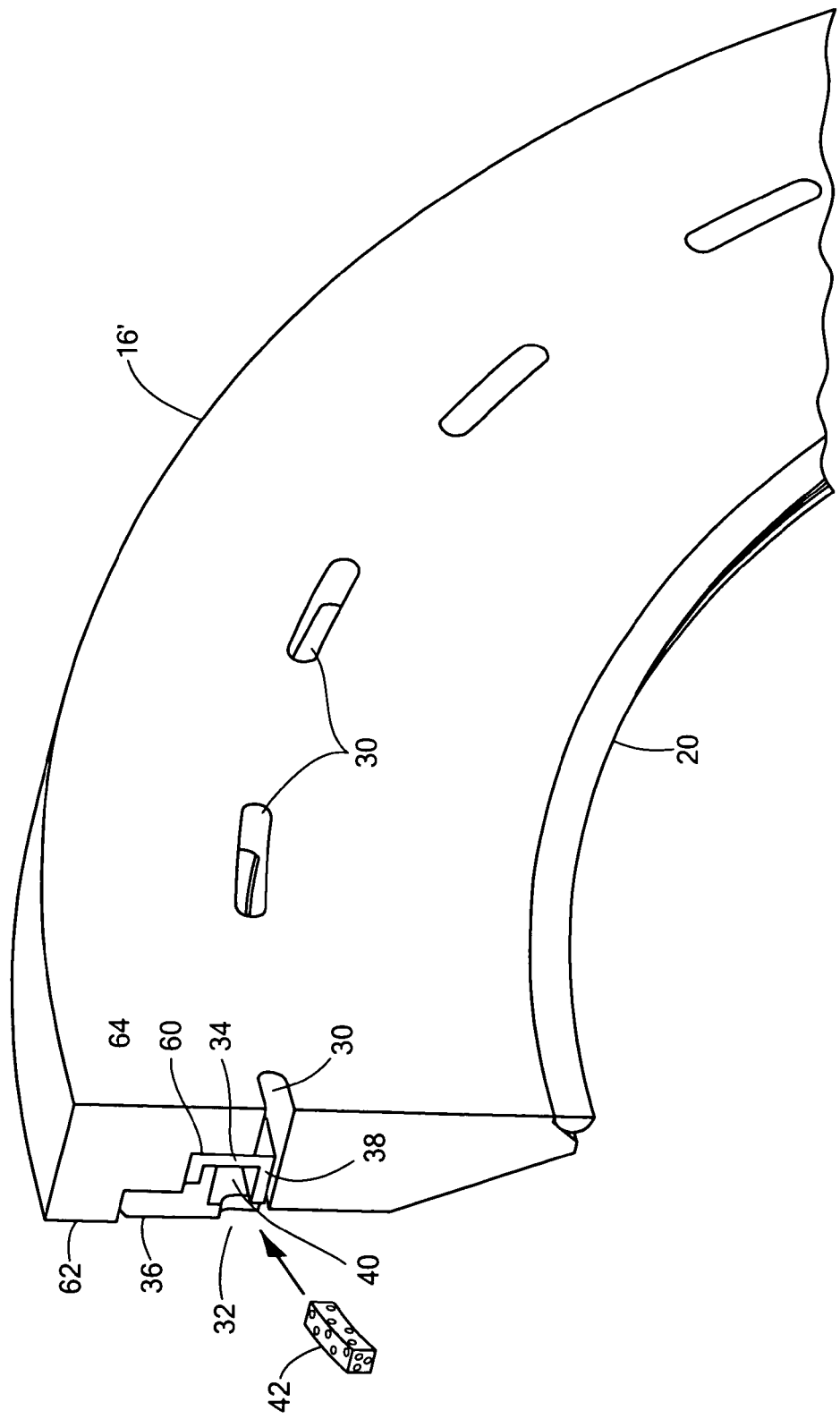
FIG. 2 is a schematic three dimensional view showing a portion of a new diaphragm seal in accordance with an example of the subject invention.

In accordance with one example of the subject invention, annular diaphragm seal 16', FIG. 2 is designed so that it can be used in conjunction with housing 12, FIG. 1. In other examples, a new housing could also be designed. Diaphragm seal 16' is designed to be rotatably disposed in the annular recess of a housing attached to a bulkhead about a shaft. Annular diaphragm seal 16' includes orifices 30 through the thickness thereof. In one design, there were 18 oval shaped orifices spaced every 14 degrees and each orifice had a minor diameter of 24.205" and a major diameter of 24.605".

In this way, when an air pressure differential exists between two compartments, the air pressure differential is reduced or eliminated via orifices 30 and diaphragm seal 16 does not lock with respect to its housing and instead keeps rotating with the shaft maintaining the integrity of O-ring 20. Diaphragm seal 16 is designed so that it does not contact the housing until water is present.

If water enters a compartment, it can flow through orifices 30 from one compartment to another. Accordingly, sealing structure 32 is provided to seal orifices 30 in the presence of water. In the particular example shown, the sealing structure 32 includes lip seal 34 held in place via retaining ring 36. Seal portion 38 of lip seal 34 is positioned to unseal the orifices when no pressure is exerted on seal portion 38 and, conversely, to seal the orifices when pressure is exerted on seal portion 38. There is preferably a sealing structure on each side of the diaphragm seal as shown in FIGS. 3-4.

In FIG. 2, pressure is exerted on seal portion 38 and all the orifices 30 are sealed via lip seal 34. In FIG. 3, no pressure is exerted on lip seal portions 38 and orifices 30 are not sealed. In one preferred example, retaining ring 36 is provided and configured to define a pocket 40, FIG. 2, which receives foam body 42 impregnated with a gel material which expands foam body 42 in the presence of liquid to exert pressure on lip seal portion 38 to seal orifices 30.

Figure 3:
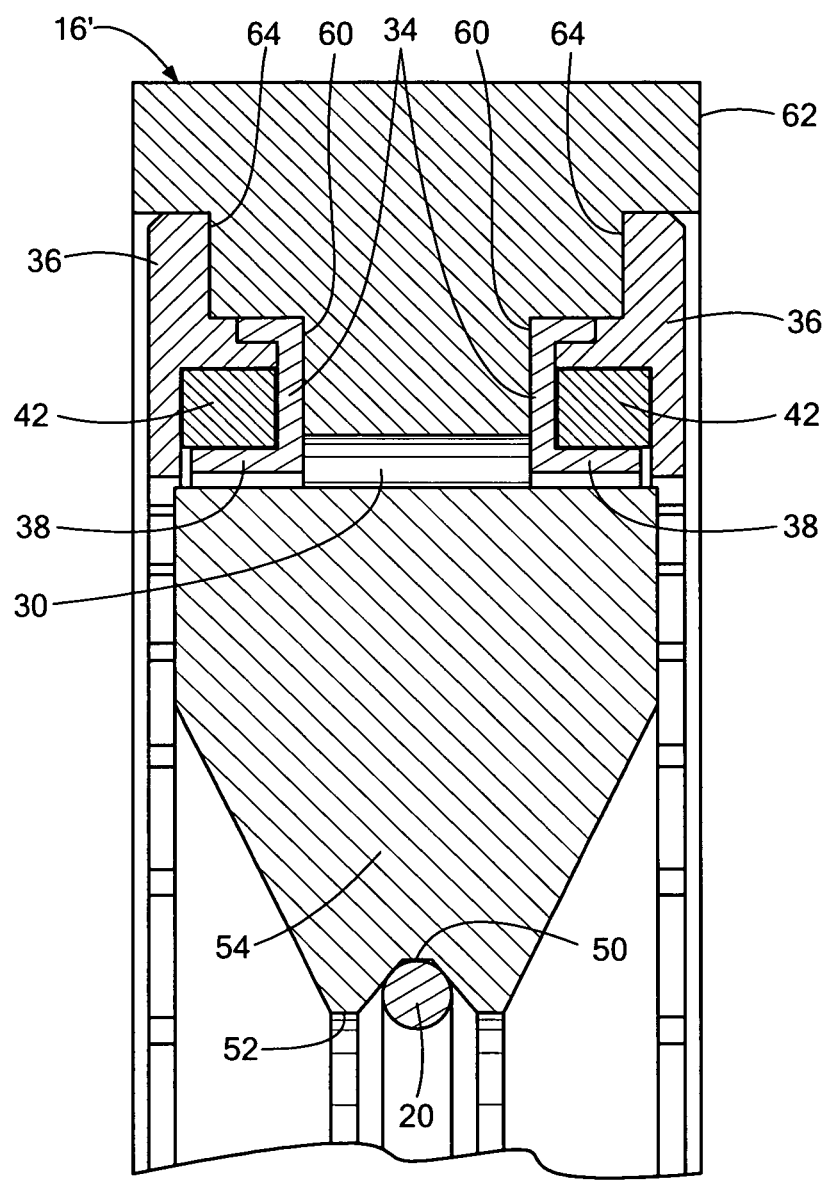
FIG. 3 is a schematic cross-sectional view of the diaphragm seal shown in FIG. 2 depicting the lip seals positioned to allow air to flow from one side of the diaphragm seal to the other through orifices in the diaphragm seal.
Figure 4:
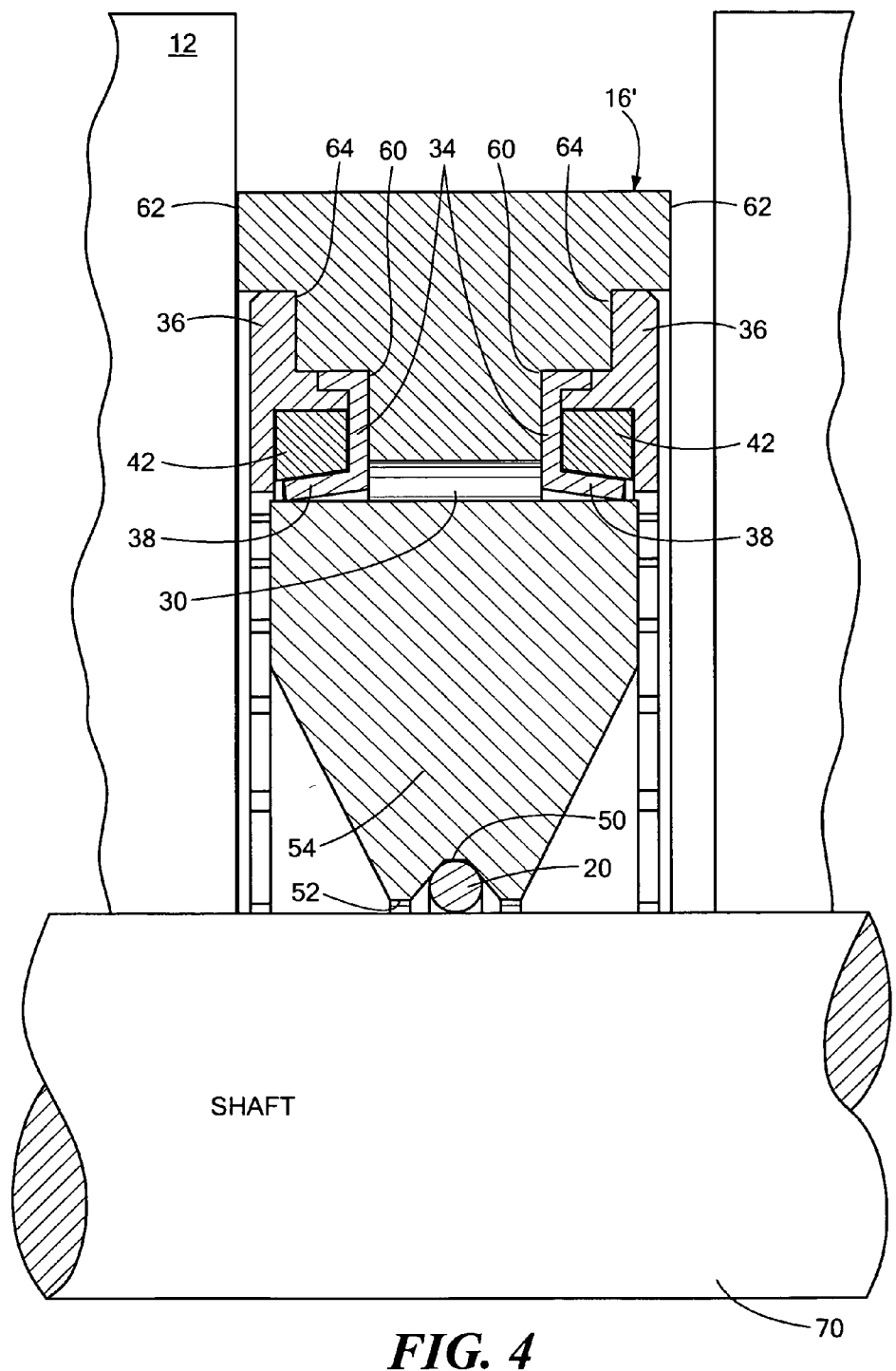
FIG. 4 is a view similar to FIG. 3 except now the lip seals have sealed each end of the orifices through the diaphragm seal.

Thus, FIG. 3 shows foam bodies 42 in their contracted states unsealing orifice 30 through the thickness of annular diaphragm seal 16' while FIG. 4 shows foam bodies 42 in their expanded states (due to the presence of liquid activating the gel impregnating the foam bodies) sealing orifice 30 on both its ends as seal portions 38 of lip seals 34 are pushed downward.

When water does enter a compartment causing foam bodies 42 to swell as shown in FIG. 4 to seal the orifices 30 through the thickness of the diaphragm seal, the resulting water pressure also causes one of the side walls 62 of the diaphragm seal to mate with housing 12 to seal the bulkhead with respect to shaft 70, FIG. 4. In this configuration, the shaft is sealed to the annular diaphragm seal via O-ring 20 and the diaphragm seal is sealed with respect to the housing which is sealed with respect to the bulkhead.

O-ring 20 may be received in groove 50 on inside surface 52 of diaphragm seal 16'. Diaphragm seal 16' typically includes tapered portion 54 terminating at inside surface 52. Modifications to the diaphragm seal may include forming first channels 60 in opposing side walls 62 of diaphragm seal 16' for lip seals 34 and also forming second channels 64 in the opposing side walls 62 of diaphragm seal 16' for retainer 36.

The gel and foam materials may be selected from those disclosed in U.S. Patent Publication Nos. 2006/0108745 and 2008/0303218 incorporated herein by this reference. Lip seal 34 is typically made of XNBR Rubber. Retainer 36 is typically made of FRY-Garolte. Diaphragm seal 16' is typically made of Manatex. Orifices 30 through the thickness of diaphragm seal 16' may be formed by machining or casting. Channels 60 and 64 may be formed by machining or casting. The diaphragm seal and/or the housing may be a fully split design as is known in the art and allow for bidirectional operation and axial and angular shaft movement. The housing may include a removable end cap to access the diaphragm seal.

The result, in the preferred embodiment, is a new seal and sealing method which addresses the problem of the prior seal failing in the presence of air pressure differentials. At the same time, the orifices through the thickness of the annular diaphragm seal which reduce or eliminate the air pressure differential problem are themselves automatically sealed with respect to liquid in the presence of a liquid via the new sealing structure. Preferably, the diaphragm seal is not sealed with respect to the housing in the absence of liquid present in at least one compartment.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A bulkhead seal comprising:
   a housing configured to be attached to a bulkhead about a shaft and defining an annular recess;
   an annular diaphragm seal rotatably disposed in the annular recess of the housing and about the shaft;
   a plurality of orifices through the annular diaphragm seal spaced circumferentially to prevent air pressure differentials from locking the annular diaphragm seal with respect to the housing;
   a lip seal on each axial side of the annular diaphragm seal including a seal portion disposed to seal and unseal the orifices;
   a retaining ring for each lip seal defining a pocket between each lip seal and its retaining ring; and
   a foam body in each pocket and including a gel material configured to expand the foam body in the presence of liquid urging the seal portions of the lip seals to seal the orifices, the gel material contracting the foam body when no liquid is present to unseal the orifices.

2. The seal of claim 1 in which there is an O-ring seal between the annular diaphragm seal and the shaft.

3. The seal of claim 2 in which the annular diaphragm seal includes an inner surface with a groove for receiving the O-ring.

4. The seal of claim 3 in which the annular diaphragm seal includes an inwardly tapered portion terminating at the inner surface.

5. The seal of claim 1 in which the annular diaphragm seal includes opposing side walls each with a first channel receiving the lip seal therein.

6. The seal of claim 1 in which the opposing side walls each with a second channel receiving the retainer therein.

7. The seal of claim 1 in which the orifices are oval shaped.

* * * * *